(12) United States Patent
Gual

(10) Patent No.: US 8,371,809 B2
(45) Date of Patent: Feb. 12, 2013

(54) WINDMILL DEVICE WITH ORIENTED AIR FLOW

(76) Inventor: Georges Gual, Toulon (FR)

(*) Notice: Subject to any disclaimer, the term of this patent is extended or adjusted under 35 U.S.C. 154(b) by 660 days.

(21) Appl. No.: 11/989,664

(22) PCT Filed: Jul. 17, 2006

(86) PCT No.: PCT/FR2006/001738
§ 371 (c)(1),
(2), (4) Date: Feb. 4, 2009

(87) PCT Pub. No.: WO2007/012726
PCT Pub. Date: Feb. 1, 2007

(65) Prior Publication Data
US 2010/0003130 A1    Jan. 7, 2010

(30) Foreign Application Priority Data
Jul. 28, 2005  (FR) ..................... 05 08054

(51) Int. Cl.
*F03B 1/04* (2006.01)
(52) U.S. Cl. ........................ 415/191; 416/243
(58) Field of Classification Search .......... 415/191; 416/243
See application file for complete search history.

(56) References Cited

U.S. PATENT DOCUMENTS

| | | | | |
|---|---|---|---|---|
| 2,989,848 A * | 6/1961 | Paiement | .................. | 60/787 |
| 4,047,834 A * | 9/1977 | Magoveny et al. | .......... | 415/53.1 |
| 4,084,918 A * | 4/1978 | Pavlecka | .................. | 415/1 |
| 5,391,926 A * | 2/1995 | Staley et al. | .................. | 290/55 |
| 5,463,257 A * | 10/1995 | Yea | .................. | 290/55 |
| 6,666,650 B1 * | 12/2003 | Themel | .................. | 416/200 R |
| 2002/0109358 A1 * | 8/2002 | Roberts | .................. | 290/54 |

FOREIGN PATENT DOCUMENTS

| | | |
|---|---|---|
| DE | 4 340 158 | 6/1995 |
| EP | 0 046 122 | 2/1982 |
| WO | WO 98/07981 | 2/1998 |

* cited by examiner

*Primary Examiner* — Julio J Maldonado
*Assistant Examiner* — Robert Bachner
(74) *Attorney, Agent, or Firm* — Patterson Thuente Christensen Pedersen, P.A.

(57) ABSTRACT

A wind power engine including a stator having stator blades, and a rotor having rotor blades. The rotor is positioned inside the hollow area of the stator and is rotationally movable with respect to the stator about an axis of rotation. The stator blades are positioned in such a way that an air flow coming from the outside of the stator is oriented towards the rotor and the rotor blades. The oriented airflow allows the rotor blades to drive the rotor about the axis of rotation. At least certain rotor blades have a concave-shaped profile on one of their faces.

10 Claims, 3 Drawing Sheets

WINDMILL DEVICE WITH ORIENTED AIR FLOW

RELATED APPLICATIONS

This application claims priority to PCT Application No. PCT/FR2006/001738 filed Jul. 17, 2006, and French Application No. 0508054 filed Jul. 28, 2005, the disclosures of which are hereby incorporated by reference in their entireties.

FIELD OF THE INVENTION

The present invention refers generally to a windmill device for the production of mechanical energy using wind force.

More specifically, the invention refers to a windmill device comprising:
a stator provided with stator blades;
a rotor provided with rotor blades placed inside a hollow area of the stator with said rotor rotating with respect to the stator about an axis of rotation, the stator blades being arranged to direct the air flow arriving from outside the stator toward the rotor, and the rotor blades being designed to cause said rotor to rotate about said axis of rotation due to the effect of said directed air flow.

BACKGROUND OF THE INVENTION

Manufacturers of windmill devices have developed various solutions aimed at producing mechanical energy from the wind with as high an efficiency as possible so that as much mechanical energy as possible can be collected from the air flow driving the rotor.

A device of the type described above achieving such a mechanical energy production is described, for example, in PCT publication WO 98/07981.

SUMMARY OF THE INVENTION

This document discloses a windmill device having a stator and a rotor installed inside the stator. Both the rotor and stator have blades. The stator blades direct the flow of the air around the device toward the location of the rotor, which can then take mechanical energy from this directed air flow in order to produce a rotary torque of the rotor about the axis of rotation.

In this context, the purpose of this invention is to provide a highly efficient windmill device, that is, one capable of providing as much rotational energy of the rotor as possible at a constant air flow.

The windmill device of this invention, which furthermore complies with the generic definition given in the preamble referred to earlier, is essentially characterized by the fact that at least some of the rotor blades have a concave profile on one side of the rotor blade.

Due to this concave profile feature, when the rotor rotates, a given blade of the rotor receiving an air flow will drive the rotor at a rotational angle that is greater than what this angle would be if the blade had a flat or convex profile on both its sides.

In addition, such a concave shape makes it possible to collect more energy from the air flow than with a blade that is flat or convex on both its sides.

Useful definitions for understanding the described invention:
the "chord" is the line segment connecting the leading edge and the trailing edge of the same blade, located in a cross section of the blade;
the "profile center line" is a curve that extends between the leading and trailing edges of the same blade and is equidistant from the opposite sides of the blade;
the "profile" is the external shape of a blade as seen in a cross section of the blade, with the cross section being perpendicular to the rotor's axis of rotation;
the "thickness" of a blade is the distance separating two opposite sides of the same blade as measured along an axis perpendicular to a tangent to the center line of the blade.

One can, for example, ensure that at least some of the stator blades also have a concave profile on one side.

This stator blade profile allows a given stator blade to be able to always direct different air flows coming to the rotor blade in the same direction while accelerating this air flow in the vicinity of its trailing edge. This local acceleration of the air flow is linked to the obstruction caused by this blade in the air flow which forces it to circumvent the blade and therefore to accelerate.

As a result, the rotor blade that is located in the vicinity of the trailing edge of the stator blade is:
firstly drawn in the direction of the stator blade due to the partial vacuum created by the stator blade in the air flow, and then;
subsequently driven by the directed air flow escaping from the trailing edge of the stator blade.

This two-stage operation causes the rotor blade to undergo an initial acceleration due to the suction, which causes it to turn until it reaches a limit position where it is then driven by the directed air flow, thus undergoing a second acceleration from this limit position.

In this way, whenever a rotor blade with a concave profile approaches a stator blade with a concave profile, the rotor blade drives the rotor and this driving action occurs at a particularly large rotation angle of the rotor that is at least greater than what it would be if the stator blades were flat or convex on both their sides.

This feature can improve the efficiency of the device of this invention.

Rotor blades with a concave profile can also each be designed with a profile center line extending between a leading edge of the blade and a trailing edge of the blade that is equidistant from the opposite sides of the blade, with the thickness of the rotor blade varying along this center line.

One embodiment of the invention includes a rotor blade of variable thickness between its leading and trailing edges, which tends to optimize the profile of each side of the rotor blade. This optimization is a function of the various positions assumed by the rotor blade as the stator rotates, and is a function of the various air flows directed by the various stator blades.

Each rotor blade can also be designed so that its leading edge is located at a greater distance from the axis of rotation than its trailing edge, and the thickness of each rotor blade having a concave profile is, on average, greater in the vicinity of the leading edge than in the vicinity of the trailing edge.

It has been noted that by designing the rotor blade wider on the side of its leading edge than on the side of its trailing edge, and by arranging the leading edge toward the outside of the rotor, the mechanical efficiency of the invention device is improved.

Rotor blades with a concave profile can also be designed so that all their concave sides are directed in the same initial clockwise or counterclockwise direction with respect to the rotor's axis of rotation, and the stator blades with a concave profile are designed with their concave sides all directed in a second direction opposite to the first.

This embodiment tends toward a homogenization of the aerodynamic behavior of the invention device, that is, this device will behave substantially in the same way if the wind changes direction, which makes it possible to always have a substantially equivalent efficiency of the device, regardless of the direction of the wind. In addition, the life cycle of the bearings supporting the axis of rotation of the device is thus improved.

Rotor blades with a concave profile can also be designed to have a chord greater than the chord of the stator blades having a concave profile.

As a result, a stator blade will have a total surface area (the sum of the surface areas of its sides) less than the total surface area of a rotor blade.

This embodiment makes it possible to minimize the amount of energy collected by the stator blades directing the air flow while maximizing the amount of energy captured by the rotor blades having a larger chord.

Each rotor blade with a concave profile can be designed so that it has a more curved profile in the vicinity of a leading edge than in the vicinity of a trailing edge.

This embodiment expresses the dissymmetry of the profile of a rotor blade. It has been noted that this dissymmetry can improve the driving efficiency of a blade.

In other words, the rotor blade profile center line is more curved in the vicinity of the leading edge than in the vicinity of the trailing edge.

Each stator blade with a concave profile can also be designed to have its profile more curved in the vicinity of a leading edge than in the vicinity of a trailing edge of this stator blade.

In one embodiment of the invention, all the stator blades can also be designed to have blade profiles substantially identical to each other and all the rotor blades to have blade profiles identical to each other.

At least one of said concave rotor blade profiles can also be designed as a transform of another concave profile of another rotor blade by means of rotation about the axis of rotation. In this embodiment, all the blades linked together by this geometric transform have a constant angle of orientation. The constant angle of orientation is the angle formed between the chord of a profile and the radius of the rotor passing through the leading edge of this profile.

This angle of orientation may be constant or variable depending on the rotational speed of the rotor and depending on the wind speed.

In all cases, the angle of orientation of the rotor blades with identical profiles is the same for all these blades, because this makes it possible to balance the stresses on the rotor and optimize efficiency by choosing an optimum angle of orientation.

Similarly, at least one of said concave stator blade profiles can also be designed as a transform of another concave profile of another stator blade by means of rotation about the axis of rotation.

In this embodiment, all the stator blades linked together by this geometric transform have a constant angle of orientation.

Similarly, the angle of orientation of a stator blade is the angle formed between the chord of the profile of this stator blade and the axis (one and the same with the rotor) passing through the rotor's axis of rotation and passing through the leading edge of this stator blade profile. The angle of the stator blades is different from the angle of orientation of the rotor blades and is preferably identical for all the stator blades.

The angle of orientation of the stator blades may be constant or variable depending on the rotational speed of the rotor and/or depending on the wind speed.

In all cases, the angle of orientation of the stator blades is identical for all these blades, because this makes it possible to balance the stresses on the rotor and optimize efficiency by choosing an optimum angle of orientation.

BRIEF DESCRIPTION OF THE DRAWINGS

Other features and benefits of the invention will become clear from the following description, given as an example and without any intention to limit the scope, in reference to the appended drawings in which.

DETAILED DESCRIPTION OF THE DRAWINGS

The invention refers to a windmill device also called a windmill with a vertical axis A.

This type of windmill has the benefit of being able to operate without having to be directed into the wind, which is advantageous in regions where the wind frequently changes direction or in areas with swirling winds (between buildings).

Such a windmill also has the benefit of being able to operate in wind speed ranges of 7 to 240 km/h, which is much broader than propeller-type windmills.

Windmill 1 of the invention consists of stator 2 having several stator blades 3.

Figure 1:
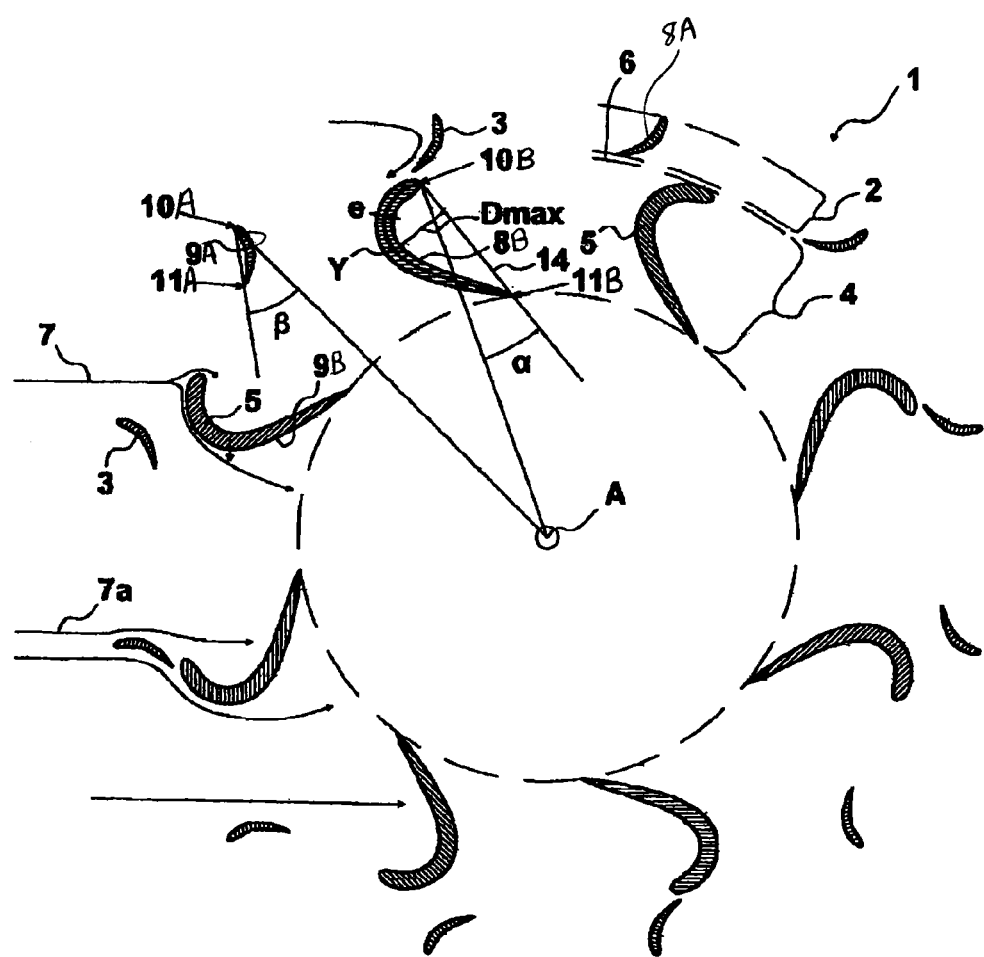
FIG. 1 shows a horizontal cross section of the windmill device of this invention along a plane perpendicular to the rotor's axis of rotation.

Stator blades 3 are mounted on a frame, not shown in FIG. 1, extending vertically along mutually parallel axes and parallel to the axis of rotation A of rotor 4. All these stator blades 3 are positioned along ring 2 centered around axis of rotation A. Leading edges 10A of stator blades 3 are located on the outside diameter of ring 2 and trailing edges 11A of these blades 3 are located on the inside diameter of the ring.

Inside stator 2 and in the form of a ring is located rotor 4 allowed to rotate with respect to the frame and the chassis. This rotor 4 has 8 blades, item 5, placed every 45° around axis of rotation A. Rotor blades 5 are parallel to each other and to axis of rotation A, and are also arranged in the form of a ring. Each leading edge 10B of a rotor blade 5 is placed substantially on an outer diameter of the rotor ring, with this outer diameter being slightly smaller than the inner diameter of stator ring 2. Each trailing edge 11B of the rotor blades 5 is arranged according to an inner diameter of rotor ring 4.

The stator blades 3 can constitute the vertical structure of the chassis, thus serving both as a blade and a rigid structure maintaining a gap between a lower portion of the chassis and an upper portion of the chassis, with these upper and lower portions of the chassis holding a bearing through which the rotational shaft of the rotor passes.

In a given construction embodiment, the stator 2 forms a single unit whose blades 3 are rigid and can be cast as a single piece.

The stator 3 has a larger number of blades, in this case 12, than the rotor 4, which has 8.

The stator blades 3 have a reduced surface profile compared to the surfaces of the rotor blades 5. As a result, the cords of the stator blades 3 are shorter than the chords of the rotor blades 5. Here, a stator blade chord is one third the size or smaller than the chord of a rotor blade.

The rotor blades 5 can be substantially identical to each other. The stator blades 3 can also be substantially identical to each other in order to balance the stresses on the axis of rotation.

For a given rotor blade 5, the maximum distance "Dmax" between the concave side of the profile and chord 14 of the blade is preferably greater than one third the chord length.

Figure 3:
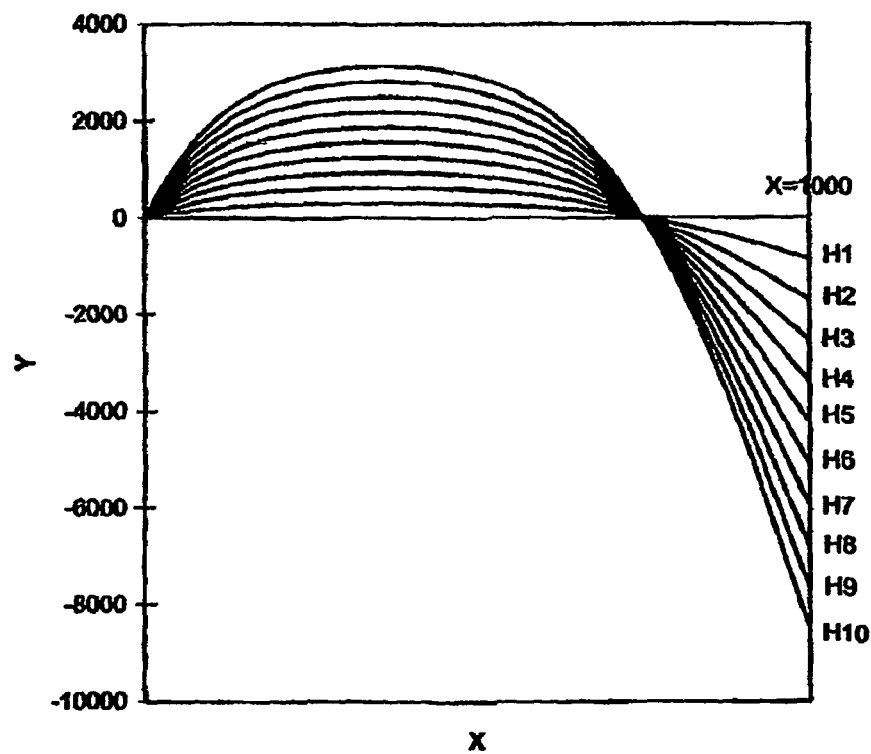
FIG. 3 shows a series of typical center line equations for rotor blades of the invention device.
Figure 5:
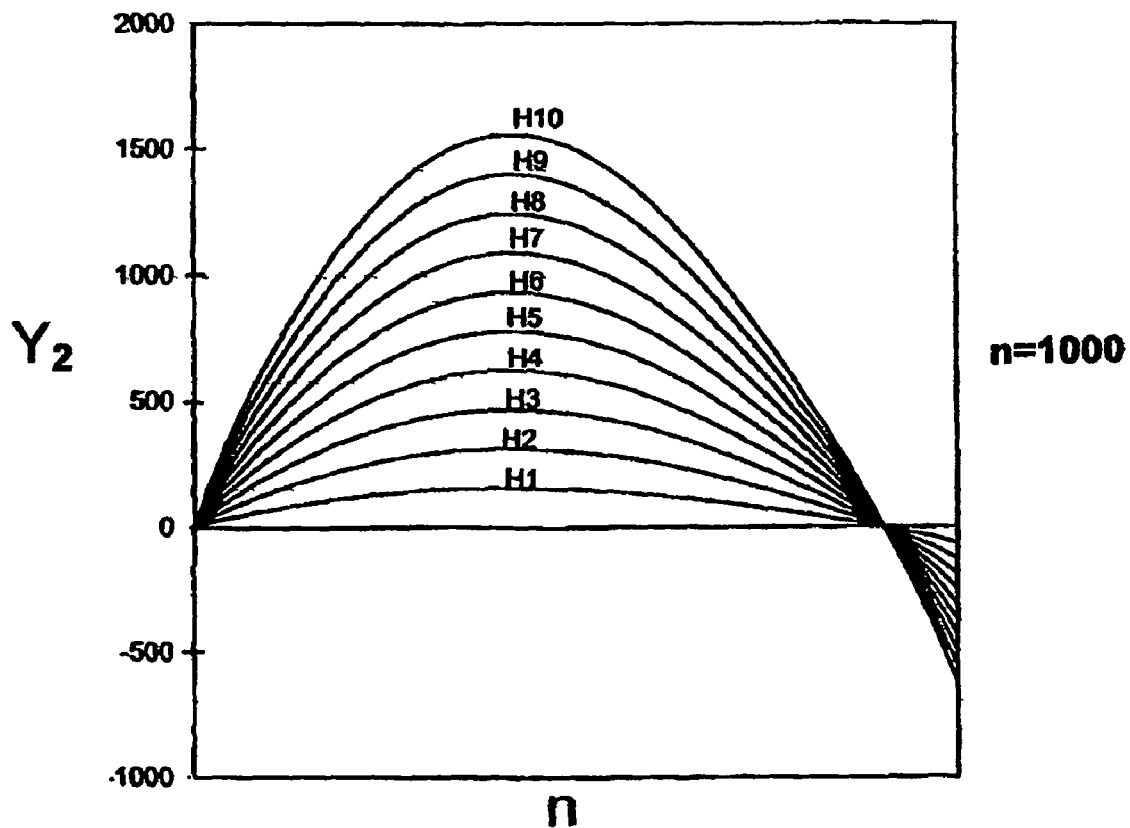
FIG. 5 shows the cross section of a stator blade along a plane perpendicular to the rotor's axis of rotation.

As we shall see in reference to FIGS. 3 and 5, several rotor blade profiles and several stator blade profiles may be suitable for implementation of the invention.

The choice of a rotor blade profile is always made according to the choice of stator blade profile and according to the number of each type of blade.

When making this choice, preference shall be given to a larger number of stator blades than rotor blades and, in addition, the curved and concave profiles of the rotor blades shall preferably be more accentuated than the curved profiles of the stator blades.

With regard to the blade settings, also referred to as orientations, all the rotor blades 5 shall be designed to have the same angle of orientation with respect to the rotor radii.

Likewise, all the stator blades 3 shall be designed to have the same angle of orientation with respect to the rotor radii. The angle of orientation of a blade is the angle formed between the chord of the blade and the radius of the rotor passing through the leading edge of the blade.

Here, the angles of orientation of the blades are fixed, but it is possible for them to be variable according to the wind speed and the rotational speed of the rotor 4.

For each rotor blade, the blade angle of orientation a here is 17°, with this angle potentially ranging from −60° to +60°.

For each stator blade 3, the blade angle of orientation β here is −30°, with this angle potentially ranging from −60° to +60°.

The angles of orientation of the rotor blades 5 shall be such that their sign is opposite that of the angles of orientation of the stator blades 3. In other words, all the rotor blades 5 are oriented so that their concave sides are facing in an initial direction opposite the second direction of orientation of the concave sides of the stator blades 3. In addition, the absolute values of the angles of orientation of the stator blades 3 shall be greater than the angles of orientation of the rotor blades 5.

Furthermore, when choosing the blades the maximum distance between the concave profile of a stator blade 3 and its chord (called the maximum stator blade concavity depth) shall preferably always be less than the maximum rotor blade concavity depth.

For a given windmill device, the maximum stator blade concavity depth is preferably one half or smaller than the maximum rotor blade concavity depth and preferably less than one fourth the maximum rotor blade concavity depth.

The outer diameter of the rotor is preferably chosen to be large so as to have a reduced angular velocity and a large drive torque. Moreover, it must be noted that a windmill 1 according to this invention, the diameter of which is about 4 meters and the blade height (of both the rotor and stator) of which is about 1.5 meters, will produce 10 kW of power with a 40 m/s wind. The windmill of this invention would ideally drive an electric generator linked to its rotor.

Figure 2:
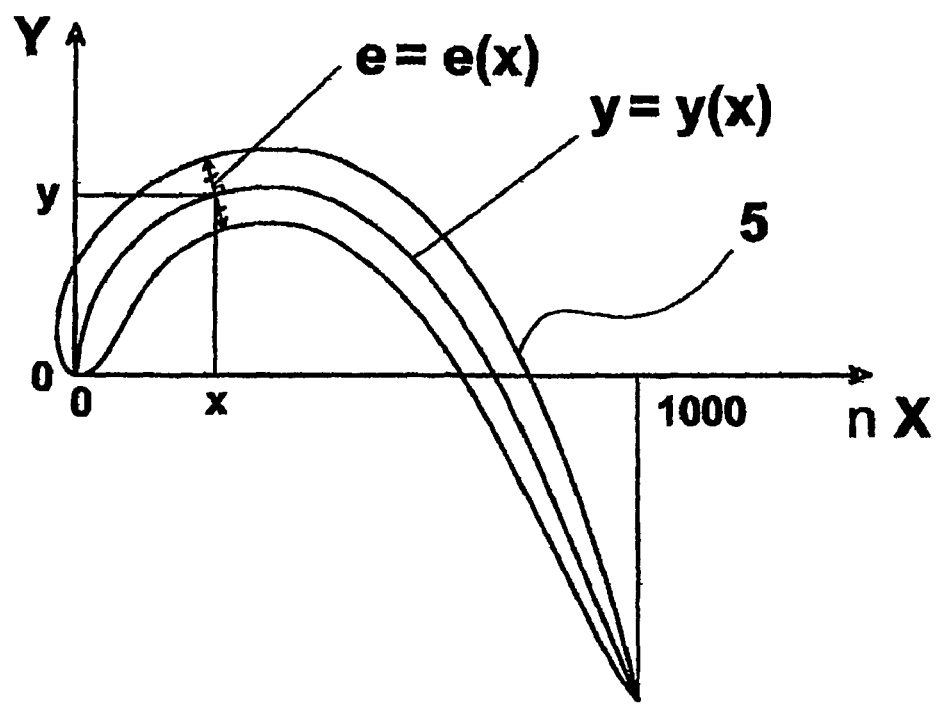
FIG. 2 shows a cross section of a rotor blade along a plane perpendicular to the rotor's axis of rotation.
Figure 4:
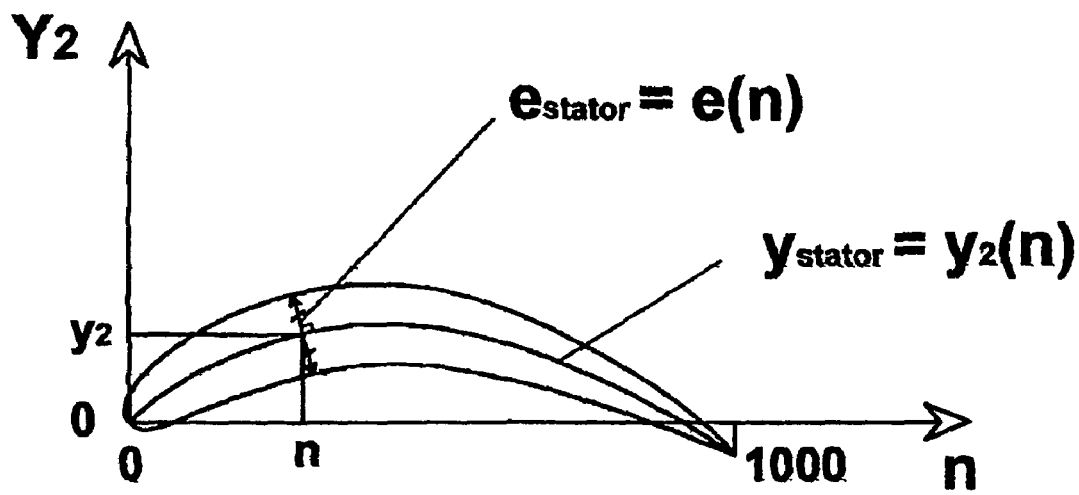
FIG. 4 shows the cross section of a stator blade along a plane perpendicular to the rotor's axis of rotation.

As shown in FIGS. 1, 2, and 4, each blade has a concave side 8A, 8B and a convex side 9A 9B and is substantially in the shape of a U in which the two legs diverge toward their respective ends. The trailing edge of each blade is thinner than its leading edge.

As shown in FIGS. 2 and 4, each blade has a thickness varying between its leading edge 10 and its trailing edge 11; this thickness is on average greater in the vicinity of the leading edge than in the vicinity of the trailing edge.

In a special embodiment, the rotor blades 5 may have a flexible and elastic portion at their trailing edges so that the profiles can adapt to the rotational speed of the windmill 1.

The flexible portion of a blade may, for example, be made of an elastomeric material.

In a given embodiment, at least some of the blades of the invention device may be designed to have a variable chord value while the windmill 1 is in operation. This can be done, for example, by means of blades with deformable trailing edges in combination with a mechanism associated with the windmill. Such an associated mechanism may, for instance, use the centrifugal force of the rotor 4 to control the chord length of the rotor blades 5 by pushing cams controlling the blade profiles. One can also imagine that flexible portions of blades can be weighted in certain locations so as to be more sensitive to the centrifugal force in these locations and thus have a tendency to move outward during rotation.

FIG. 2 shows a rotor blade cross section along a plane perpendicular to the rotor's axis of rotation.

This rotor blade is defined according to an equation defining the blade center line:

$$y(x) = h \cdot [4.53924825656325E-15 \cdot x^6 - 5.42573283309221E-12 \cdot x^5 - 8.22404455343498E-09 \cdot x^4 + 1.47496347999709E-05 \cdot x^3 - 9.14165759434127E-03 \cdot x^2 + 2.70776188332093E+00 \cdot x]$$

This equation exists for any $x \in [0; 1000]$ and for whole natural number $h \in [0; 10]$.

For a given value of H, we obtain a given center line curve as shown in FIG. 3, which represents all the possible center lines of rotor blades as a function of all the values of H.

The profile of a rotor blade is also defined by the equation:

$$e = e(x)$$

where e is the thickness of the blade measured at each point along center line Y. It must be noted that for every point on the center line, the blade thickness is measured along a direction perpendicular to the tangent to center line Y passing through that point.

e(x) exists within three continuous spaces of x with a constant value $k \in [0.001; 10]$ For every $x \in [0; 51.3006]$, the rotor blade thickness is defined by the following equation:

$$e = e_1(x)$$

$$e_1(x) = k \cdot [-7.02909007666008E-08 \cdot x^6 + 1.42084379948226E-05 \cdot x^5 - 1.13859019776896E-03 \cdot x^4 + 4.60183508412229E-02 \cdot x^3 - 1.01685048226136E+00 \cdot x^2 + 1.39236480857944E+01 \cdot x]$$

For every $x \in [51.3006; 525.9584]$ the rotor blade thickness is defined by the following equation:

$$e = e_2(x)$$

$$e_2(x) = k \cdot [-5.94192525848265E-14 \cdot x^6 + 1.19655992810047E-10 \cdot x^5 - 9.58413323952827E-08 \cdot x^4 + 3.86158163821414E-05 \cdot x^3 - 8.12835542224338E-03 \cdot x^2 + 8.47965024169246E-01 \cdot x + 1.06357560124414E+02]$$

And lastly, for every $x \in [525.9584; 1000]$ the rotor blade thickness is defined by the following equation:

$$e = e_3(x)$$

$e_3(x)=k\cdot[-2.61247460038894E-11\cdot x^5+$
   $8.88126229434927E-08\cdot x^4-$
   $1.19740568019024E-04\cdot x^3+$
   $7.96002077190937E-02\cdot x^2-$
   $2.60528565693262E+01\cdot x+3.5060023062638E+03]$ It must be noted that k is a fixed value chosen as a function of the desired profile, which is unique for the three intervals of x given above.

It must also be noted that the higher the value of H, the more curved the center curve of the rotor blade thus defined.

The profile of a stator blade, such as that shown in FIG. 4, is defined in the same fashion by the formula $y_{stator}=y_2(n)$.

With $y_2(n)=h\cdot[-1.94954719956322E-15\cdot n^6+$
   $5.40955746739588E-12\cdot n^5-$
   $5.43503282008121E-09\cdot n^4+$
   $2.61713607223324E-06\cdot n^3-$
   $1.50507215970919E-03\cdot n^2+$
   $8.01028434915793E-01\cdot n]$ This equation is defined for every $n \in [0; 1000]$ and for every natural whole number $h \in [0; 10]$.

For a chosen value of H, one obtains a given center line curve as shown in FIG. 5, which represents all the possible center lines of stator blades as a function of all values of H.

The profile of a rotor blade is also defined by the equation of its thickness: $e_{stator}=e(n)$ where e is the thickness of the stator blade measured at every point along the center line $Y_{stator}$. It must be noted that for every point on the center line, the stator blade thickness is measured in a direction perpendicular to the tangent to the center line passing through the point.

e(n) is defined for three continuous spaces of n, where n is the variable for a constant $k_{stator} \in [0.001; 10]$.

For every $n \in [0; 16.5034]$ the stator blade thickness is defined by the following equation:

$$e=e_1(n)$$

$e_1(n)=k_{stator}\cdot[-1.67858234660962E-01\cdot n^2+$
   $6.52945696164534E+00\cdot n]$ For every $n \in [16.5034; 487.7208]$ the stator blade thickness is defined by the following equation:

$$e=e_2(n)$$

$e_2(n)=k_{stator}\cdot[-1.31492504582848E-13\cdot n^6+$
   $2.42841713930692E-10\cdot n^5-$
   $1.76997851485279E-07\cdot n^4+$
   $6.48783281727058E-05\cdot n^3-$
   $1.30476488540274E-02\cdot n^2+$
   $1.53332766717071E+00\cdot n+$
   $4.07781151901127E+01]$ And lastly, for every $n \in [487.7208; 1000]$ the stator blade thickness is defined by the following equation:

$$e=e_3(n)$$

$e_3(n)=k_{stator}\cdot[-4.2644799481108E-14\cdot n^6+$
   $1.79579350585858E-10\cdot n^5-$
   $3.12129258602187E-07\cdot n^4+$
   $2.86483050345019E-04\cdot n^3-$
   $1.46611774549957E-01\cdot n^2+$
   $3.95910672914926E+01\cdot n-$
   $4.26155072994836E+03]$ It must be noted that the higher the value of H, the more curved the center curve of the stator blade thus defined.

It must also be noted that the value $k_{stator}$ is a constant chosen as a function of the desired type of stator blade profile, with this constant being the same for the three domains of n.

The rotor blades 5 and stator blades 3 with concave profiles are configured and arranged so that when the rotor 4 rotates and a leading edge of a rotor blade 5 is located opposite a stator trailing edge, the tangent to the center line of the stator blade 3 at its trailing edge is substantially parallel to the tangent to the center line of the rotor blade 5 at its leading edge. The result of this feature is that, in the majority of cases, the air flow directed by a given stator blade 3 will travel directly along the tangent to the center line of the rotor blade 5 at its leading edge, which reduces turbulence detrimental to the efficiency of the windmill device.

In reference to FIG. 1, air flow 7 arrives at stator blade 3 of stator 2 and is split into two diverted flows passing on either side of the stator blade 3. The rotor blade 5 whose leading edge is substantially opposite the trailing edge of the stator blade 3 is drawn by a partial vacuum exerted on its convex side by the diverted flow, and driven by a pressure exerted by the flow directed toward its concave side.

The invention claimed is:

1. A windmill device comprising:
   a stator provided with a plurality of stator blades; and
   a rotor provided with a plurality of rotor blades and positioned inside a hollow area of the stator,
   wherein said rotor is adapted to rotate with respect to the stator about an axis of rotation and wherein the plurality of stator blades are adapted to direct an air flow coming from outside the stator toward the rotor, and the rotor blades being adapted to cause said rotor to rotate about said axis of rotation due to the effect of said directed air flow,
   and wherein:
   at least some of the plurality of rotor blades have a concave profile on one side,
   at least some of the plurality of stator blades have a concave profile on one side,
   and wherein the rotor blades with a concave profile have a chord greater than a chord of the stator blades having a concave profile,
   and wherein a maximum distance between a concave side of the concave profile of each of the at least some of the rotor blades and the chord of the respective rotor blade is greater than one third of a length of the chord and a tangent to a center line of the stator blade at its trailing edge is substantially parallel to a tangent to a center line of the rotor blade at its leading edge.

2. The device according to claim 1, wherein each rotor blade having a concave profile has a profile center line extending between a leading edge of the blade and a trailing edge of the blade that is equidistant from an opposite sides of the blade, and wherein a thickness of the rotor blade varies along the profile center line.

3. The device according to claim 2, wherein the leading edge of each rotor blade is located further away from the axis of rotation than the trailing edge of the blade, and wherein the thickness of each rotor blade with a concave profile is, on average, greater in an area of the leading edge than in an area of the trailing edge.

4. The device according to claim 1, wherein all the rotor blades with a concave profile have the concave sides facing in an initial clockwise or counterclockwise direction with respect to the axis of rotation of the rotor, and wherein the stator blades with a concave profile have all the concave sides facing in a second direction opposite the initial direction.

5. The device according to claim 1, wherein each rotor blade with a concave profile has a more curved profile in an area of a leading edge of the blade than in an area of a trailing edge of the blade.

6. The device according to claim 1, wherein each stator blade with a concave profile has a more curved profile in an area of a leading edge of the blade than in an area of a trailing edge of the blade.

7. The device according to claim 1, wherein all the stator blades have blade profiles substantially identical to each other.

8. The device according to claim 1, wherein all the rotor blades have blade profiles identical to each other.

9. The device according to claim 1, wherein at least one of said concave rotor blade profiles is a mapping of the concave profile of another rotor blade about the axis of rotation.

10. The device according to claim 1, wherein at least one of said concave stator blade profiles is a mapping of the concave profile of another stator blade about the axis of rotation.

* * * * *